United States Patent
Xu et al.

(10) Patent No.: US 10,592,365 B2
(45) Date of Patent: Mar. 17, 2020

(54) METHOD AND APPARATUS FOR MANAGING STORAGE SYSTEM

(71) Applicant: EMC IP Holding Company LLC, Hopkinton, MA (US)

(72) Inventors: Xinlei Xu, Beijing (CN); Jian Gao, Beijing (CN); Yousheng Liu, Beijing (CN); Changyu Feng, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 15/846,319

(22) Filed: Dec. 19, 2017

(65) Prior Publication Data

US 2018/0210798 A1    Jul. 26, 2018

(30) Foreign Application Priority Data

Dec. 21, 2016    (CN) .......................... 2016 1 1193846

(51) Int. Cl.
*G06F 11/00*    (2006.01)
*G06F 11/20*    (2006.01)
*G06F 11/10*    (2006.01)

(52) U.S. Cl.
CPC ...... *G06F 11/2094* (2013.01); *G06F 11/1092* (2013.01); *G06F 2201/805* (2013.01); *G06F 2201/82* (2013.01); *G06F 2201/85* (2013.01)

(58) Field of Classification Search
CPC ............. G06F 11/2094; G06F 11/1092; G06F 2201/805; G06F 2201/82; G06F 2201/85; G06F 2201/81; G06F 3/0646; G06F 3/0655; G06F 3/0656; G06F 3/0659; G06F 3/0683; G06F 3/0685; G06F 3/0689; G06F 2003/0691; G06F 2212/602; G06F 2212/6022; G06F 2212/6024; G06F 2212/6026
See application file for complete search history.

(56) References Cited

U.S. PATENT DOCUMENTS

| 9,569,569 | B1 | 2/2017 | Colon et al. |
| 9,811,380 | B1 | 11/2017 | Martin et al. |
| 9,940,033 | B1 | 4/2018 | Alshawabkeh et al. |
| 10,254,970 | B1 | 4/2019 | Martin et al. |
| 2011/0258391 | A1* | 10/2011 | Atkisson ............... G06F 11/108 711/118 |
| 2013/0080828 | A1* | 3/2013 | Sheffield ............. G06F 11/1662 714/6.22 |

* cited by examiner

Primary Examiner — Anthony J Amoroso
(74) Attorney, Agent, or Firm — BainwoodHuang

(57) ABSTRACT

The present invention discloses a method and device for managing a storage system. Specifically, in one embodiment of the present invention, there is proposed a method for managing a storage system, the storage system comprising a buffer device and a plurality of storage devices. The method comprises: receiving an access request with respect to the storage system; determining a storage device among the plurality of storage devices has been failed; and in response to the access request being an access request with respect to the failed storage device, serving the access request with data in the buffer device so as to reduce internal data access in the storage system. In one embodiment of the present invention, there is proposed a device for managing a storage system.

21 Claims, 14 Drawing Sheets

METHOD AND APPARATUS FOR MANAGING STORAGE SYSTEM

RELATED APPLICATIONS

This application claim priority from Chinese Patent Application Number CN201611193846.7, filed on Dec. 21, 2016 at the State Intellectual Property Office, China, titled "METHOD AND APPARATUS FOR MANAGING STORAGE SYSTEM" the contents of which is herein incorporated by reference in its entirety.

FIELD

Various embodiments of the present invention relate to storage management, and more specifically, to a method and a device for managing a storage system (e.g., Redundant Array of Independent Disks (RAID)).

BACKGROUND

With the development of data storage techniques, various data storage devices now provide users with higher and higher data storage capacity, and also their data access speed has been increased greatly. Besides the increase of data storage capacity, users also impose greater and greater demands on data reliability and response time of storage systems.

So far various data storage systems based on redundant arrays of disks have been developed for improving reliability of data. When one or more disks in a storage system fail, data in failed disk(s) can be recovered from other normal disk. However, in the rebuilding process for data recovery, data access requests received by the storage system will take up various resources in the storage system, and further interfere with the rebuilding process. Therefore, it becomes a focus of research regarding how to manage the storage system more effectively and alleviate interference of data access requests in the rebuilding process.

SUMMARY

Therefore, it is desirable to develop and implement a technical solution that is capable of reducing interference of data access to a rebuild process and further improve the operation efficiency and security of a storage system. It is desired that the technical solution can be compatible with existing storage systems and manage storage areas in the storage system more efficiently without extra hardware devices added to existing storage systems.

In one embodiment of the present invention, there is provided a method for managing a storage system, the storage system comprising a buffer device and a plurality of storage devices. The method comprises: receiving an access request with respect to the storage system; determining a storage device among the plurality of storage devices has been failed; and in response to the access request being an access request with respect to the failed storage device, serving the access request with data in the buffer device so as to reduce internal data access in the storage system.

In one embodiment of the present invention, there is provided a device for managing a storage system comprising a buffer device and a plurality of storage devices. The device comprises: one or more processors; a memory coupled to at least one processor of the one or more processors; computer program instructions stored in the memory which, when executed by the at least one processor, cause the device to execute a method for managing a storage system. The method comprises: receiving an access request with respect to the storage system; determining a storage device among a plurality of storage devices has been failed; and in response to the access request being an access request with respect to the failed storage device, serving the access request with data in the buffer device so as to reduce internal data access in the storage system.

In one embodiment of the present invention, there is provided a device for managing a storage system comprising a buffer device and a plurality of storage devices The device comprises: a receiving module configured to receive an access request with respect to the storage system; a determining module configured to determine a storage device among a plurality of storage devices has been failed; and a utilizing module configured to, in response to the access request being an access request with respect to the failed storage device, serve the access request with data in the buffer device so as to reduce internal data access in the storage system.

With the technical solution of the present invention, disturbance caused by data access to a rebuild process may be reduced, and further the operation efficiency and security of the storage system may be improved.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
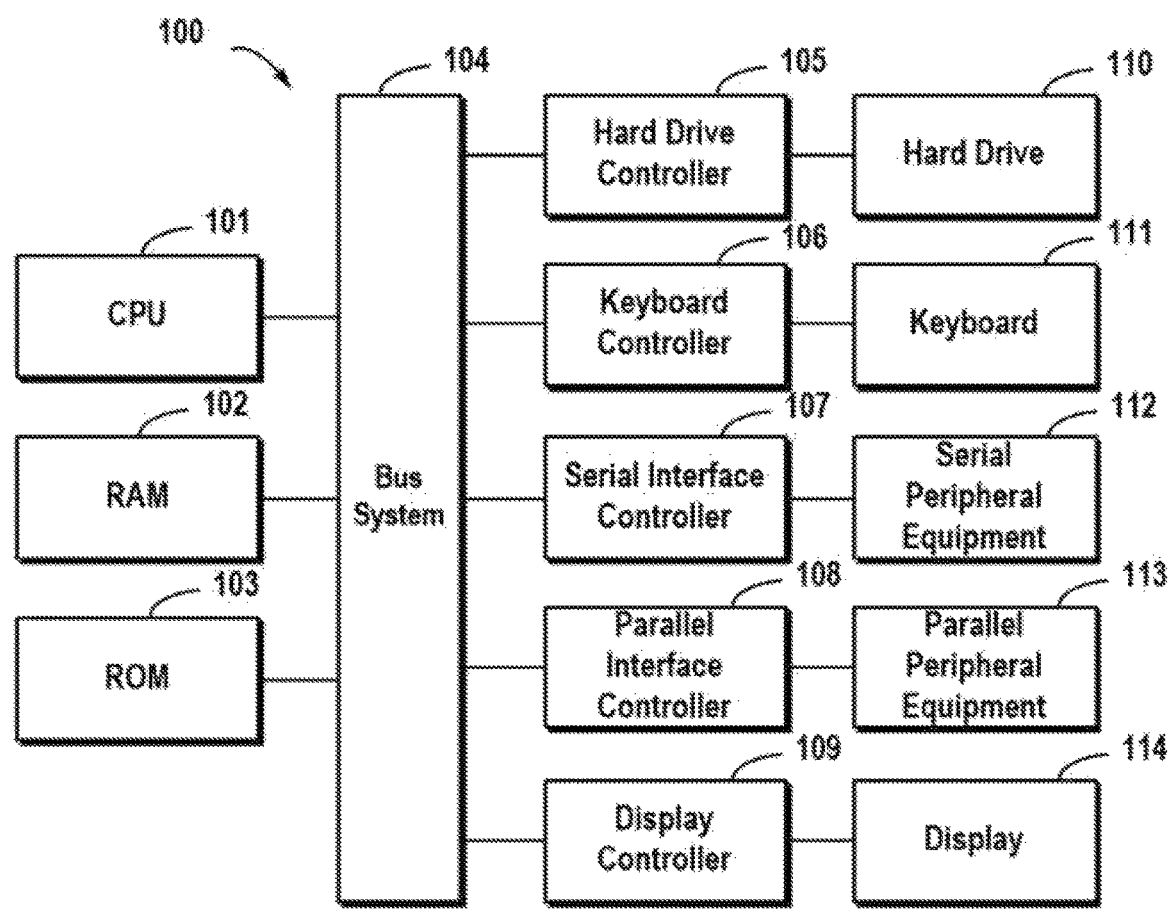
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) may combine multiple storage devices in to an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 2A:
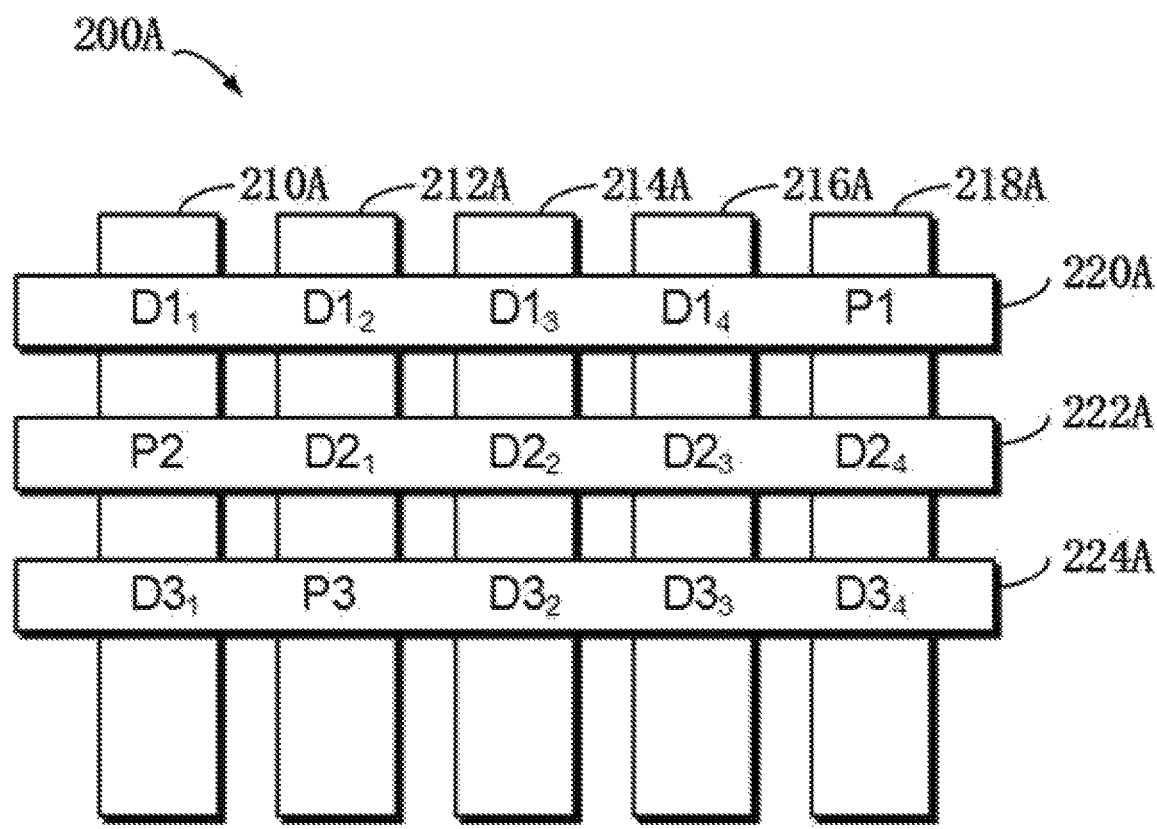
FIGS. 2A and 2B schematically illustrate block diagrams of an application environment where the embodiments of the present invention may be implemented.

FIG. 2A schematically illustrates a schematic view 200A of a structure of RAID according to one technical solution. In this figure, working principles of RAID are illustrated by taking RAID-5, which consists of five independent storage devices (210A, 212A, 214A, 216A and 218A), as an example. It should be noted although in FIG. 2A there are schematically shown five storage devices, in other embodiments more or less storage devices may be comprised according to different versions of RAID. Moreover, although in FIG. 2A there are shown stripes 220A, 222A and 224A, in other examples the RAID system may further comprise a different number of stripes.

In RAID, a stripe crosses multiple physical storage devices (for example, the stripe 220A crosses the storage devices 210A, 212A, 214A, 216A and 218A). The stripe may simply be construed as a storage area among multiple storage devices which satisfies a given address range. Data stored in the stripe 220 comprises multiple parts: a data block $D1_1$ stored in the storage device 210A, a data block $D1_2$ stored in storage device the 212A, a data block $D1_3$ stored in the storage device 214A, a data block $D1_4$ stored in the storage device 216A, and a data block P1 stored in the storage device 218A. In this example, the data blocks $D1_1$ $D1_2$, $D1_3$ and $D1_4$ are stored data, and the data block P1 is a parity of the stored data.

The mode of storing data in other stripes is similar to that in the stripe 220A, and the difference is that a parity about other data block may be stored in other storage device than the storage device 218A. In this way, when one of the multiple storage devices 210A, 212A, 214A, 216A and 218A fails, data in the failed device may be recovered from other normal storage devices.

Figure 2B:
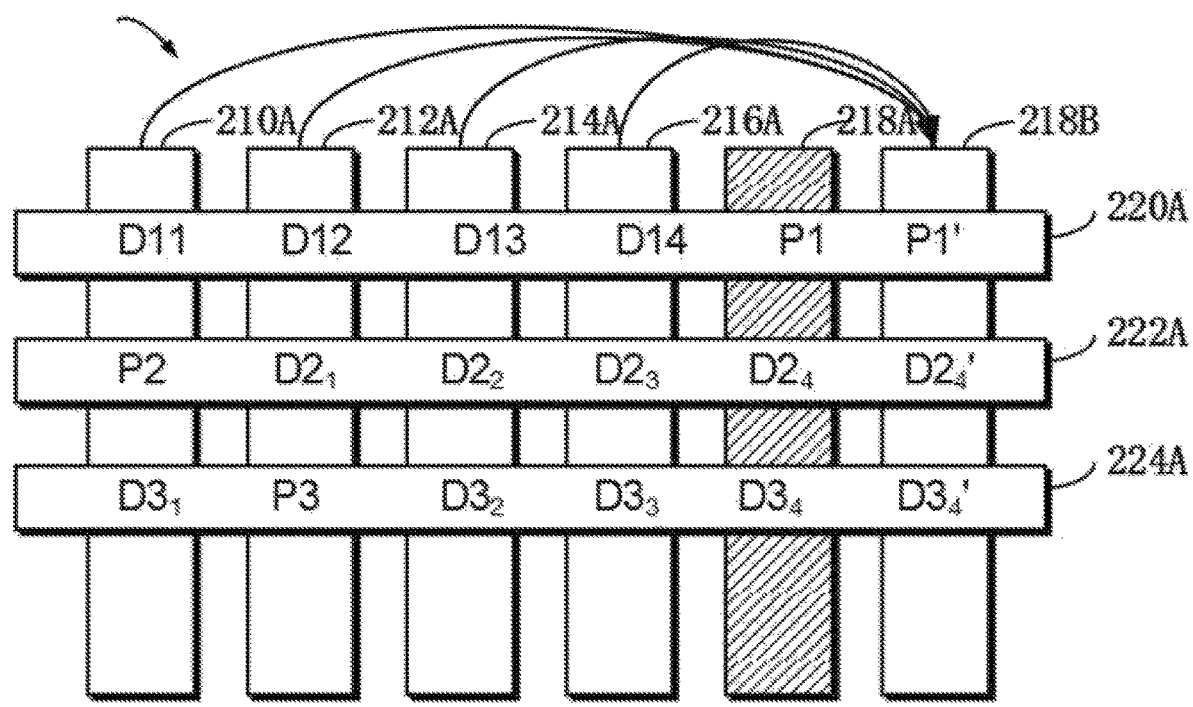

FIG. 2B schematically illustrates a schematic view 200B of rebuilding process of RAID. As shown in FIG. 2B, when one storage device (e.g., the storage device 218A shown in shadow) fails, data may be recovered from the remaining storage devices 210A, 212A, 214A and 216A that operate normally. At this point, a new backup storage device 218B may be added to RAID to replace the storage device 218A. In this way, recovered data may be written to 218B, and a system rebuild may be effected.

The storage system still can receive an external data access (e.g., read/write) request in the rebuilding process. However, when the access request wants to perform data access (e.g., write) to the failed storage device, since the storage system is being rebuilt, a conventional data access operation will be replaced by a series of complex operations. Specifically, if the storage system receives a writing request with respect to the failed storage device, then the following operations need to be performed in the storage system: (1) writing data to a journal; (2) writing data to a RAID address space; (3) comparing data written in steps (1) and (2) so as to verify data in the RAID address space is correct; and (4) invaliding data in the journal. As compared with a conventional write, steps (1), (3) and (4) are all extra additional steps.

On the one hand, these additional steps have to be executed within the storage system in the rebuilding process, which will cause huge interference in rebuilding. These additional steps will impose an extra burden on the storage system and increase the rebuild time. On the other hand, the security of the storage system during a rebuild is rather bad. For the RAID5 system as shown in FIGS. 2A and 2B, only 4 storage devices operate normally during a rebuild, and once one of the 4 storage devices fails, unrecoverable data loss will be caused to the storage system. The longer the rebuild time, the larger a risk to the storage system being rebuilt. Therefore, it is desirable to develop a technical solution that is capable of managing the storage system more effectively in case of any failed storage device.

To solve the foregoing drawbacks, the embodiments of the present invention provide a method for managing a storage system. Specifically, the storage system comprises a buffer device and a plurality of storage devices, the method comprising: receiving an access request with respect to the storage system; determining a storage device among the plurality of storage devices has been failed; in response to the access request being an access request with respect to the failed storage device, serving the access request with data in the buffer device, so as to reduce internal data access in the storage system.

Figure 3:
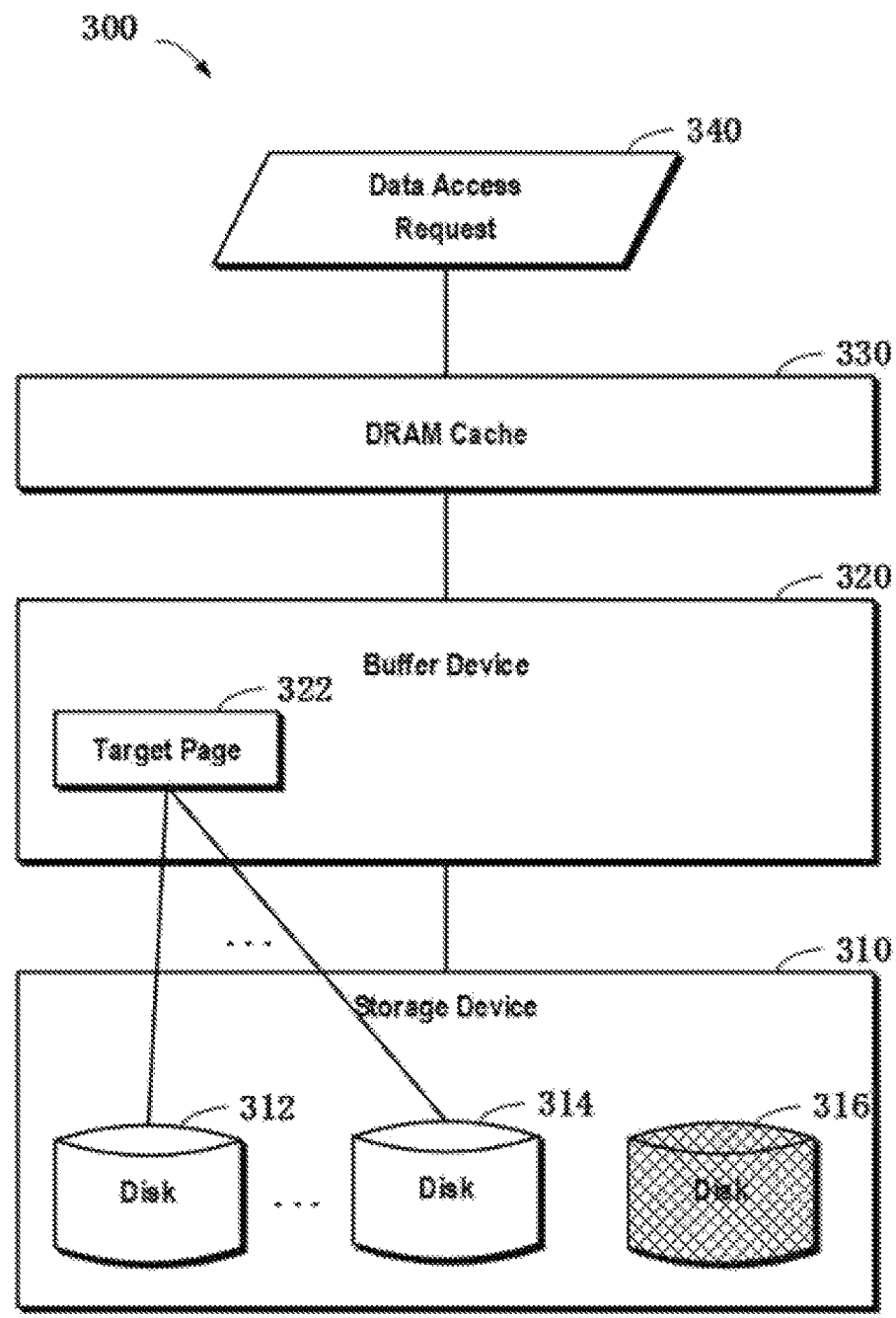
FIG. 3 schematically illustrates a block diagram of a technical solution for managing a storage system according to one embodiment of the present invention.

FIG. 3 schematically shows a block diagram 300 of a technical solution for managing a storage system according to one embodiment of the present invention. As shown in FIG. 3, the storage system may comprise, for example, three layers of storage structures: a storage device 310 is an underlying storage device, e.g., may comprise a solid state disk (SSD) 312 and/or a disk 314; the storage device 310 has a lower data access speed, whereas such a type of storage media has a large storage capacity and is cheap, and thus may provide a large capacity of data storage for a data system. A buffer device 320 (e.g., solid state cache) has a quite high data access speed; this type of storage media may be used as a buffer device, and recently accessed data may be loaded from the storage device 310 to the buffer device so as to provide higher response efficiency for future data access. A dynamic random access memory (DRAM) cache 330 has a much faster data access speed, to which the most-recently accessed data or important data may be loaded, so that data access requests may be served with higher efficiency.

When the storage system receives a data access request 340, a search may be sequentially conducted in the DRAM cache 330 and the buffer device 320, and if the search hits, the received access request 340 may be served directly on the basis of data in these fast devices; if the search misses, then data has to be fetched from the slow storage device 310. In this way, the three-layer storage structures 310, 320 and 330 may work in coordination so as to provide a faster data response.

As shown in FIG. 3, suppose a disk 316 is failed, then when a reading request with respect to the failed disk 316 is received, data to be accessed needs to be recovered from remaining normal disks 312, . . . , 314. For another example, when the access request is a writing request, data cannot be directly written to the failed disk 316 but to the remaining normal disks 312, . . . , 314. According to the technical solution of the present invention, during a rebuild after a storage device in the storage system is failed, the access request may be served using data in the buffer device as much as possible, so as to reduce internal data access in the storage system (e.g., the additional steps (1), (3) and (4) described above). Further, various resources in the storage system may be preferentially allocated for the rebuild process of the storage system.

Figure 4:
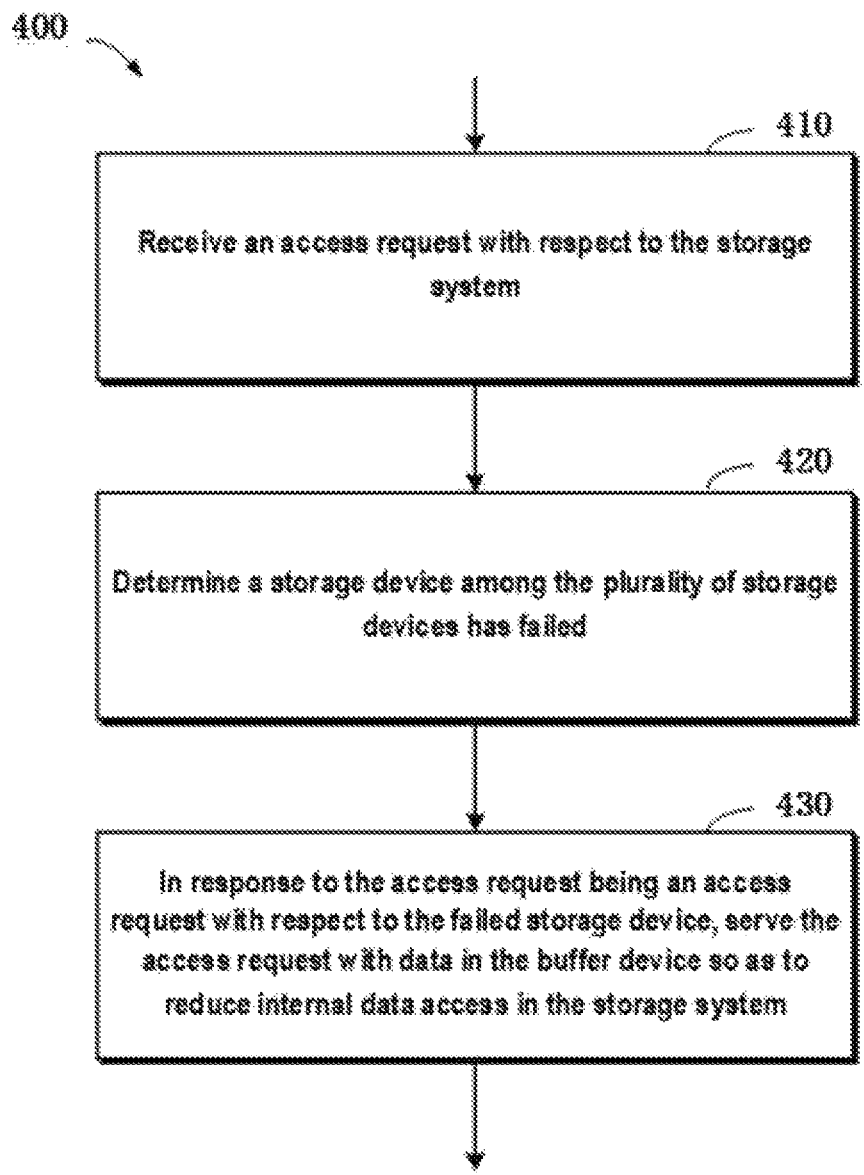
FIG. 4 schematically illustrates a flowchart of a method for managing a storage system according to one embodiment of the present invention.

FIG. 4 schematically shows a flowchart 400 of a method for managing a storage system according to one embodiment of the present invention. In step 410, an access request with respect to the storage system is received. The access request in this step may be a reading request or a writing request. In step 420, it is determined a storage device among the plurality of storage devices has been failed. The method disclosed herein is particularly applicable to a rebuild of the storage system, so there is a need to detect whether a storage device in the system has been failed, and to perform further processing in case of a failed storage device.

In step 430, in response to the access request being an access request with respect to the storage device, the access request is served using data in the buffer device, so as to reduce internal data access in the storage system. According to the embodiments of the present invention, a customized identifier may be used to indicate the access request is an access request with respect to the failed storage device. Concrete details of an identification step will be described below.

Where the received access request is an access request with respect to the failed device, if data is read/written according to the existing solution, then a great many additional steps will be generated and the rebuild of the storage system will be disturbed. Therefore, in step 430, the buffer device may be used as far as possible to respond to the access request, so as to reduce the extra workload in the storage system caused by access to the failed storage device.

In one embodiment of the present invention, in response to the access request missing the buffer device: if the access request is a reading request, an access history of historical access requests with respect to the storage system is bypassed; and target data associated with the access request as recovered from other storage devices than the failed storage device in the storage system is loaded to a target page in the buffer device; and returning data in the target page from the buffer device so as to respond to the access request.

In this embodiment, data associated with the access request might reside in the buffer device (hit), or data associated with the access request might not reside in the buffer device (miss), at which point a subsequent step may be determined on the basis of the hit or miss. If the access request misses the buffer device, then a type (read/writing request) of the access request may be judged, and subsequent processing may be performed on the basis of the type.

In the prior art, whether to load various data blocks to the buffer device is determined by recording an access history of each data block in the storage device. For example, a data structure for recording an access history may be arranged for the storage device, the number of occurrences of access to each data block in the storage device within a specific period of time (e.g., 10 minutes or other time intervals) may be recorded in the data structure. Only when the number of occurrences of access to a given data block reaches a predetermined threshold (e.g., 3), the data block will be loaded from the storage device to the buffer device. Thereby, upon receiving an access request with respect to the data block subsequently, the access request may be served by the buffer device, instead of data being read from the storage device.

Unlike technical solutions in the prior art, in the embodiments of the present invention, when it is determined the access request is a reading request with respect to the failed storage device, the access history of historical access requests with respect to the storage system will be bypassed, and target data associated with the reading request will be directly loaded from the storage device to the buffer device. Note since the target device being accessed at this point is a failed storage device, the target data cannot be directly read therefrom, but the target data has to be recovered from other normal storage device in the storage system and recovered data may be loaded to the buffer device. In this way, during operation of the system, if an access request with respect to the same target data is received in future, then the access request may be directly served by the buffer device.

In one embodiment of the present invention, in response to the access request being a reading request with respect to the failed storage device, the access request is marked. In this way, it can be recognized whether or not the received access request is an access request requiring special processing (i.e., needing to bypass an access history).

In one embodiment of the present invention, in response to the access request being a non-marked reading request, the access request is processed on the basis of an access history of historical access requests with respect to the storage system. In this embodiment, if the access request is not marked, this means the access request is not a reading request with respect to the failed storage device but a reading request with respect to a normal storage device. At this point, such a type of access requests may be processed on the basis of an access history.

In one embodiment of the present invention, the processing the access request on the basis of an access history of historical access requests with respect to the storage system comprises: in response to the access history indicating the frequency of access to data associated with the access request does not satisfy a predetermined condition, updating the access history, and retrieving data associated with the access request from a storage device in the storage system. Specifically, suppose the received reading request is not marked and it is learned from the access history that the number of occurrences of access to target data associated with the reading request within a predetermined period of time is 1, then at this point the updated access history is 1+1=2. Subsequently, data needs to be retrieved from a storage device specified by the access request, and retrieved data is used to respond to the access request.

In one embodiment of the present invention, the processing the access request on the basis of an access history of historical access requests with respect to the storage system comprises: in response to the access history indicating the frequency of access to data associated with the access request satisfies a predetermined condition, loading the data to the buffer device. Continuing the foregoing example, suppose a reading request with respect to the same data is received again after a period of time, then at this point the updated access history is 2+1=3. Where a loading condition is "the number of access occurrences=3", target data may be loaded to the buffer device from a corresponding storage device.

In one embodiment of the present invention, the serving the access request with data in the buffer device so as to reduce internal data access in the storage system comprises: in response to the access request being a writing request, writing target data associated with the access request to a target page in the buffer device; and delaying flushing data in the target page to the storage device.

As concrete details of the access request being a reading request have been described in detail above, when the access request is a writing request, data to be written may be directly written to the buffer device. According to a conventional technical solution, data will not be saved in the buffer device for long. But after a specified period of time or in response to insufficiency of storage spaces in the buffer device, data in the buffer device will be flushed to a storage device. Unlike the conventional technical solution, in the embodiments of the present invention, the access request with respect to the failed storage device will be served using the buffer device as much as possible, so as to reduce internal data communication in the storage system and ease disturbance to the rebuild process of the storage system. Therefore, in the embodiments of the present invention, flushing data in the target page to the storage device may be delayed.

Figure 5:
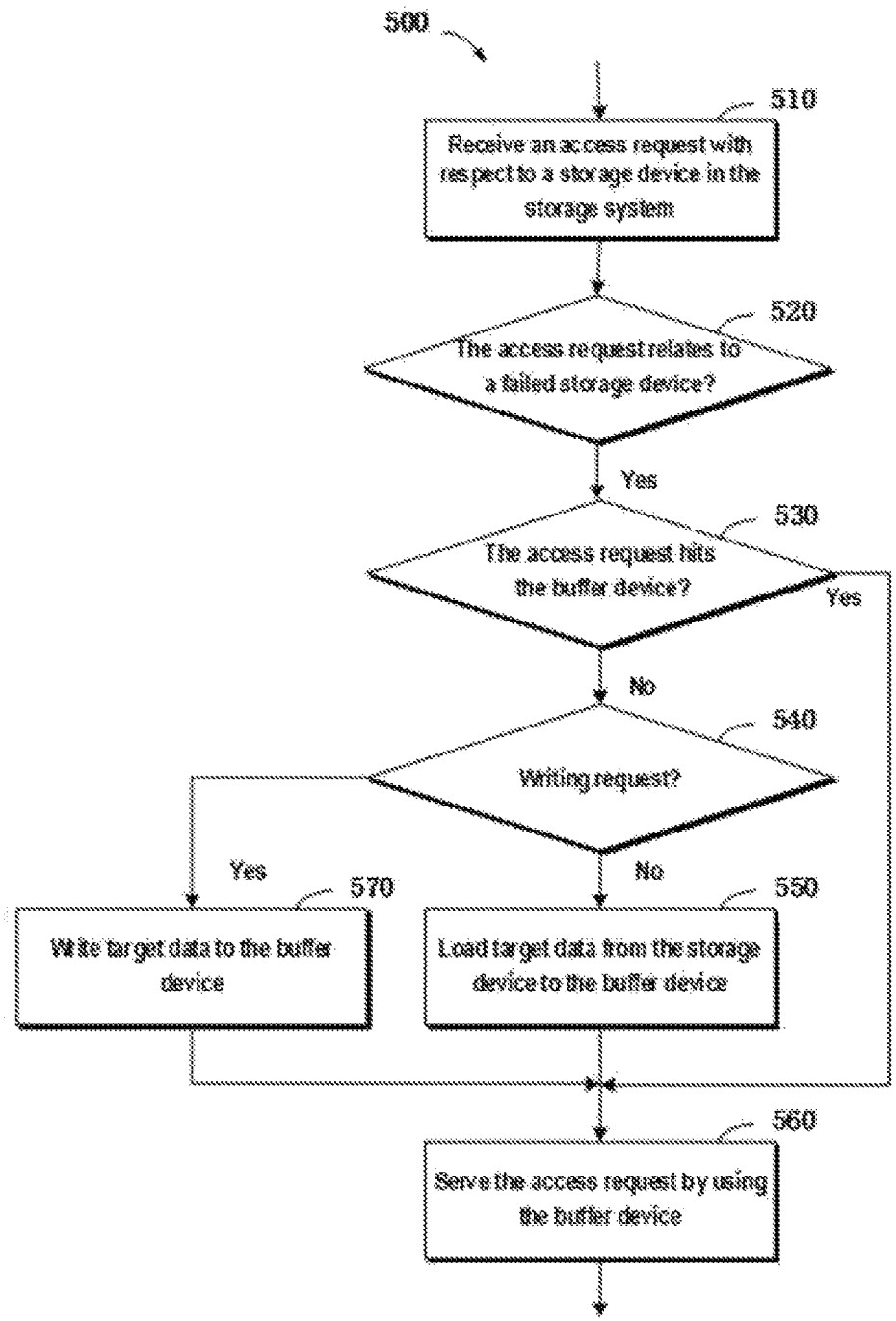
FIG. 5 schematically illustrates a block diagram of a method for managing a storage system according to one embodiment of the present invention.

FIG. 5 schematically shows a flowchart 500 of a method for managing a storage system according to one embodiment of the present invention. As shown in FIG. 5, in step 510 an access request with respect to a storage device in the storage system is received. In step 520, it may be determined whether the received access request relates to a failed storage device or not. If the access request is an access request with respect to a normal storage device, then it may be processed conventionally. If it is determined the access request relates to a failed storage device, then the operation proceeds to step 530 where it is further judged whether the access request hits the buffer device or not. If yes, the operating flow proceeds to step 560 where the access request may be served by hit data in the buffer device; otherwise the operating flow proceeds to step 540.

In step 540, a type of the access request may be judged; if the access request is a reading request, then the operation proceeds to step 550. In step 550, the access history may be bypassed and target data associated with the access request may be directly loaded from the storage device to the buffer device. Subsequently in step 560, the access request is served using the buffer device. If it is found in step 540 the access request is a writing request, then the operating flow proceeds to step 570. In step 570, target data associated with the writing request may be directly written to the buffer device. Subsequently in step 560, the access request is served using the buffer device.

In one embodiment of the present invention, the delay may include various meanings. For example, a target page associated with the access request for accessing the failed storage device may be saved in a waiting queue. When flushing operation is triggered periodically, flushing operation to data in the waiting queue may be triggered at longer time intervals. For another example, where flushing operation is triggered because of insufficiency of available storage spaces in the buffer device, a conventional queue relating to target pages associated with access requests for accessing a normal storage device may be processed first, and more data in the conventional queue may be flushed to the storage device so as to release spaces in the buffer device. In this way, more storage spaces may be allocated in the buffer device for the failed storage device.

In one embodiment of the present invention, the delaying flushing data in the target page to the storage device comprises: adding the target page to a waiting queue, the waiting queue including a data page associated with the storage device; determining a priority for the waiting queue; in at least one round, flushing data in a data page in the waiting queue to a further storage device on the basis of the priority.

Figure 6:
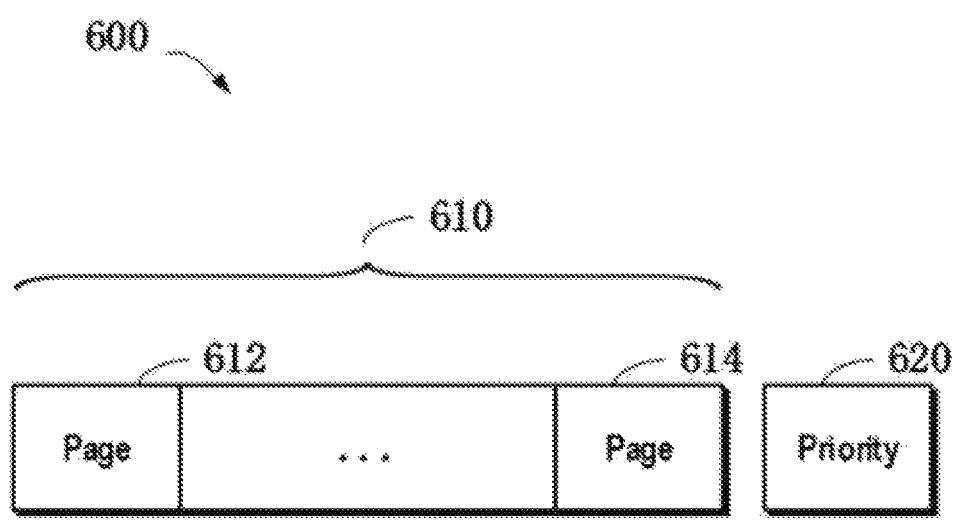
FIG. 6 schematically illustrates a block diagram of a solution for managing a buffer device in a storage system according to one embodiment of the present invention.

Specifically, FIG. 6 schematically shows a block diagram of a solution for managing a buffer device in a storage system according to one embodiment of the present invention. A target page associated with an access request for accessing the failed storage device may be inserted into a waiting queue 610 as shown in FIG. 6. At this point, the queue 610 comprises at least one data page 612, . . . , 614 associated with a storage device (e.g., failed storage device) in the storage system. Here, a priority 620 may be determined for the queue 610 to indicate whether a page in the queue should be flushed to a corresponding storage device in each round of flushing operation. Although FIG. 6 only shows one queue 610, a plurality of queues may be provided. For example, each storage device (including the failed storage device and normal storage devices) among storage devices in a Redundant Array of Independent Disks may be provided with one queue separately. Or, each LUN may be provided with one queue.

On the basis of the structure shown in FIG. 6, in each round of operation, it may be judged whether the priority meets a predetermined condition, so as to determine whether flushing operation is to be performed to one or more pages in the queue. A value of the priority of the queue may be modified, and whether to perform flushing is determined on the basis of the modified priority in the next round.

In one embodiment of the present invention, the flushing data in a data page in the waiting queue to the further storage device on the basis of the priority comprises: in response to the priority not satisfying a predetermined condition, updating the priority according to an updating rule, the updating rule making the updated priority much closer to the predetermined condition than the priority; and in response to the priority satisfying the predetermined condition, flushing data in a data page in the waiting queue to the further storage device.

Figure 7:
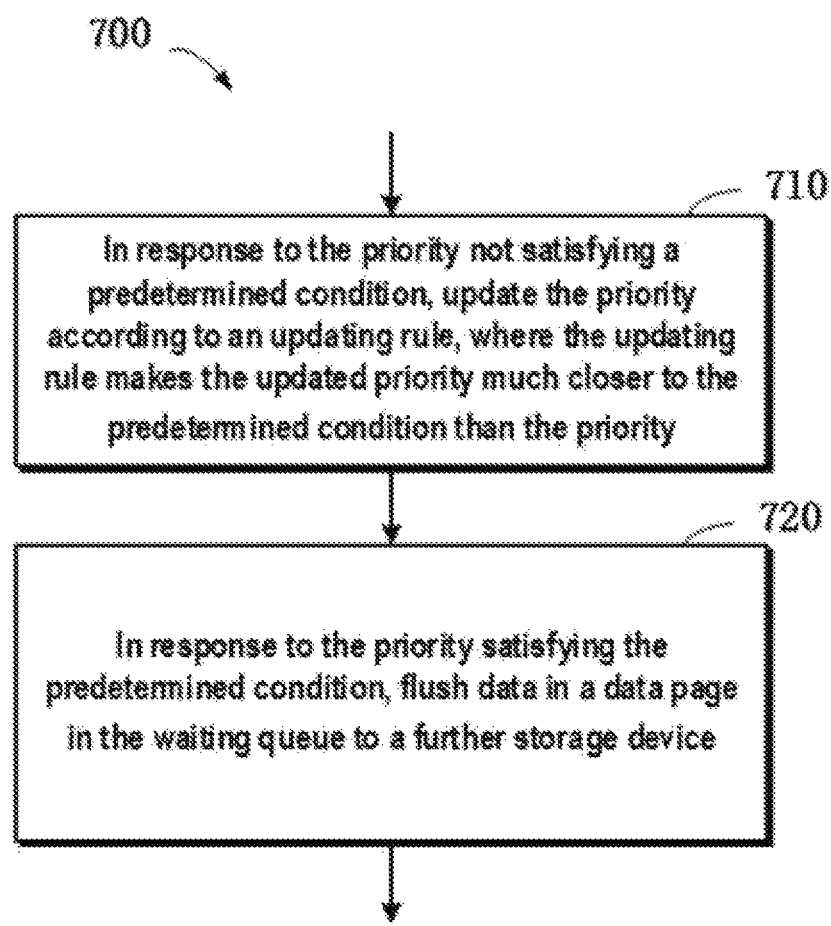
FIG. 7 schematically illustrates a flowchart of a method for managing a buffer device in a storage system according to one embodiment of the present invention.

With reference to FIG. 7, a detailed description is presented below to concrete steps of the method of the present invention. FIG. 7 schematically shows a flowchart 700 of a method for managing a buffer device in a storage system according to one embodiment of the present invention. Specifically, in this embodiment queues and priorities may be stored using the structure as shown in FIG. 6. For example, a priority field according to the present invention may be stored in association with a queue in the existing technical solution so as to set a priority for a queue. In this step, the priority may be stored in various formats. For example, the priority may be represented using an integer, a real number or other format.

Note in this step at least one data page in the queue may involve a variety of circumstances. For example, the data page may be a page which is loaded from a storage device to the buffer device in response to receiving a reading request with respect to the storage device; for another example, the data page may further be a page which is temporarily written to the buffer device in response to receiving a writing request with respect to a storage device and which will be finally flushed to a page in the storage device.

In step 710, in at least one round, in response to the priority not satisfying a predetermined condition, the priority is updated according to an updating rule, the updating rule making the updated priority much closer to the predetermined condition than the priority. Concrete content of the predetermined condition may be customized. For example, when the priority is represented as an integer or a real number, the predetermined condition may be set as "priority=0," "priority≤0" or the like. Concrete content of the updating rule may also be customized. For example, when the priority is represented as an integer or a real number, the updating rule may be set as: taking a current priority minus/plus one step length as the updated priority. Note the updating rule here should try to make the updated priority much closer to the predetermined condition than the current priority. In step 720, in response to the priority satisfying the predetermined condition, data in a data page in the waiting queue is flushed to the further storage device.

For the sake of description, an integer is taken as a specific example of the priority below. For example, a priority "2" may be assigned to the queue, the predetermined condition may be "priority=0," and the updating rule may be "updated priority=current priority−1". At this point, in the first round, a priority 3 does not satisfy the predetermined condition and should be updated as 3−1=2. No page in the queue will be flushed to the storage device. In the second round, a priority 2 does not satisfy the predetermined condition and hence should be updated as 2−1=1. At this point, no page in the queue will be flushed to the storage device. In the third round, the priority is updated as 1−1=0, at which point the predetermined condition "priority=0" is satisfied. Hence, a page (e.g., one or more pages) in the queue may be flushed to the storage device.

In one embodiment of the present invention, the determining a queue for the waiting queue comprises: setting the priority on the basis of at least one of: a response time associated with the failed storage device, a usage rate of the buffer device by the failed storage device, and an access frequency of access requests with respect to the failed storage device.

In this embodiment, the priority of a storage device might be affected by various factors. For example, if the storage device has a quite long response time, this means the storage device has a lower access speed, at which point a page (e.g., data associated with a writing request and to be written to the storage device, or data associated with a reading request and stored in the storage device) associated with the storage device should be saved in the buffer device with a higher access speed for as long as possible.

For another example, if data associated with a storage device already takes up most storage spaces in the buffer device (e.g., a high usage rate), this means only a few storage spaces in the buffer device can serve other storage devices. At this point, the usage rate associated with the storage device may be reduced properly (for example, one or more pages in the queue are flushed to the storage device).

Still for another example, if the frequency (e.g., represented as input/output per second (IOPS)) of received access requests with respect to a storage device is quite high, this means data in the storage device is more likely to be accessed, so more spaces should be allocated in the buffer device for the storage device.

In one embodiment of the present invention, the setting the priority comprises at least one of: in response to an increment of the response time being larger than or equal to a first predetermined threshold, increasing the priority; in response to an increment of the usage rate being larger than or equal to a second predetermined threshold, reducing the priority; and in response to an increment of the access frequency being larger than or equal to a third predetermined threshold, increasing the priority. Specifically, a value of the priority may be calculated from Formula 1 below:

$$S = \frac{\alpha \cdot r \cdot \gamma \cdot f}{\beta \cdot u} \quad \text{Formula 1}$$

Where S denotes a value of a first priority, r denotes a response time (e.g., represented as ms) associated with the first storage device, u denotes a usage rate (e.g., represented as percentage) of the first storage device in utilization of the buffer device, f denotes an access frequency (e.g., represented as IOPS) of access requests with respect to the first storage device, and α, β and γ denote respective customized weights.

In one embodiment of the present invention, a value of the priority may further be calculated on the basis of other formula. For example, the calculation may be based on Formula 2 (the parameters in Formula 2 have the same definitions as those in Formula 1). Or those skilled in the art may further customize other formula to determine the priority for the queue.

$$S = \alpha \cdot r + \gamma \cdot f - \beta \cdot u \quad \text{Formula 2}$$

In this embodiment, the calculated priority may be normalized within a predetermined range, for example, the calculated value may be mapped to a range [0-10]. The updating rule may be defined on the basis of a range of priorities. For example, the size of a step length in the updating rule may be determined on the basis of a value range of priorities. Regarding the range [0-10], a decreasing step length in the updating rule may be set to 1. At this point, if the priority of a queue is 10, then the queue will go through flushing operation in the 10th round. If the decreasing step length is 2, then the queue will go through flushing operation in the 5th round.

In one embodiment of the present invention, the flushing data in a data page of the waiting queue to the further storage device on the basis of the priority comprises: selecting a target page from the waiting queue according to the least recently used (LRU) standard; and flushing data in the target page to the failed storage device.

Figure 8:
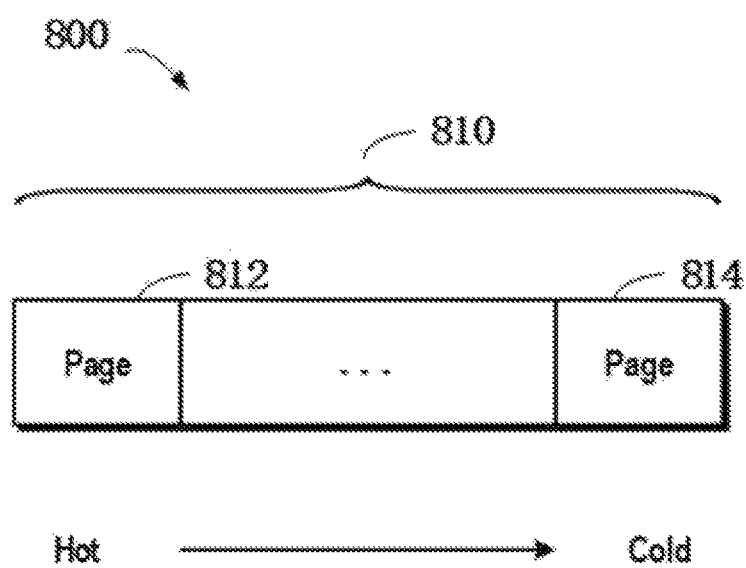
FIG. 8 schematically illustrates a block diagram for managing a queue in a buffer device in a storage system according to one embodiment of the present invention.

In this embodiment, a target page to be flushed may be selected on the basis of the LRU standard. Alternatively, queues may be ranked according to the LRU standard. FIG. 8 schematically shows a block diagram 800 for managing a queue in a buffer device in a storage system according to one embodiment of the present invention. As shown in FIG. 8, a queue 810 comprises pages 812, ..., 814, and these pages may be ranked in hot-to-cold order. In this way, when it is determined on the basis of priorities that data in the queue needs to be flushed, the coldest page 814 may be selected from the end of the queue 810 as the target page.

Concrete steps of operation performed to a queue associated with a failed storage device have been described with reference to FIGS. 6 to 8. Note in the embodiments of the present invention, the buffer device may further comprise multiple queues, and each of the multiple queues may comprise pages associated with a corresponding storage device (including a failed storage device and a normal storage device). Each queue may have its own priority, and the method described with reference to FIGS. 6 to 8 may be performed to each queue.

In one embodiment of the present invention, a second priority is determined for a second waiting queue included in the buffer device, the second waiting queue comprising a data page associated with a second storage device other than the failed storage device; in at least one round, data in a data page in the second waiting queue is flushed to the second storage device on the basis of the second priority.

In this embodiment, the second queue is a queue different than the waiting queue, and the priority, predetermined condition and updating rule for the second queue are either the same as or different than those for the waiting queue. In addition, there may exist a plurality of second queues. For example, in the RAID storage system, a second queue may be set for each normal storage device other than the failed storage device. Suppose two normal storage devices in the storage system have completely same configurations and running states, at this point respective priorities, predetermined conditions and updating rules for the two storage devices may be identical. For another example, if configurations and running states of two normal storage devices differ, then different priorities, predetermined conditions and updating rules may be set for the two normal storage devices.

Figure 9A:
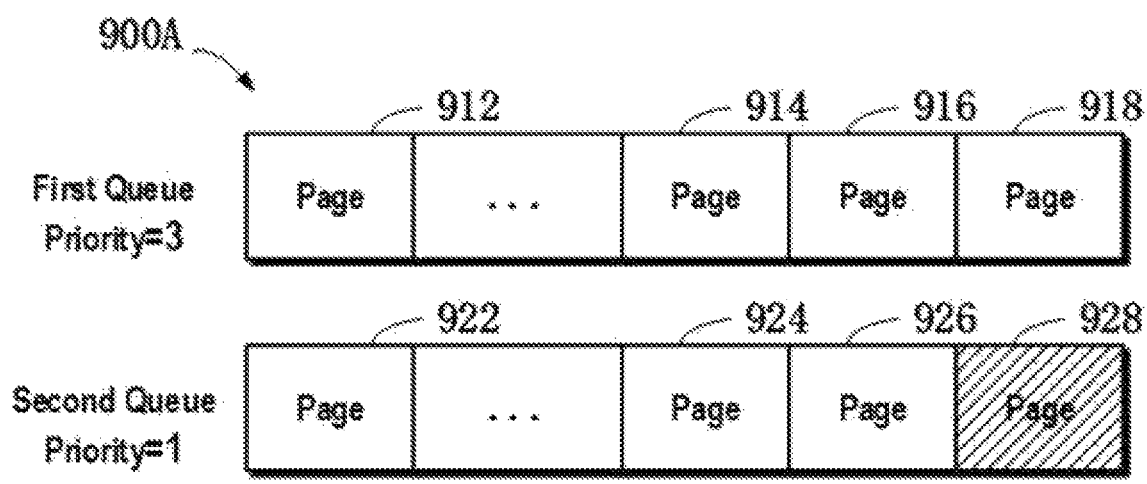
FIGS. 9A, 9B and 9C schematically illustrate respective block diagrams of different stages for managing a buffer device in a storage system according to one embodiment of the present invention.
Figure 9B:
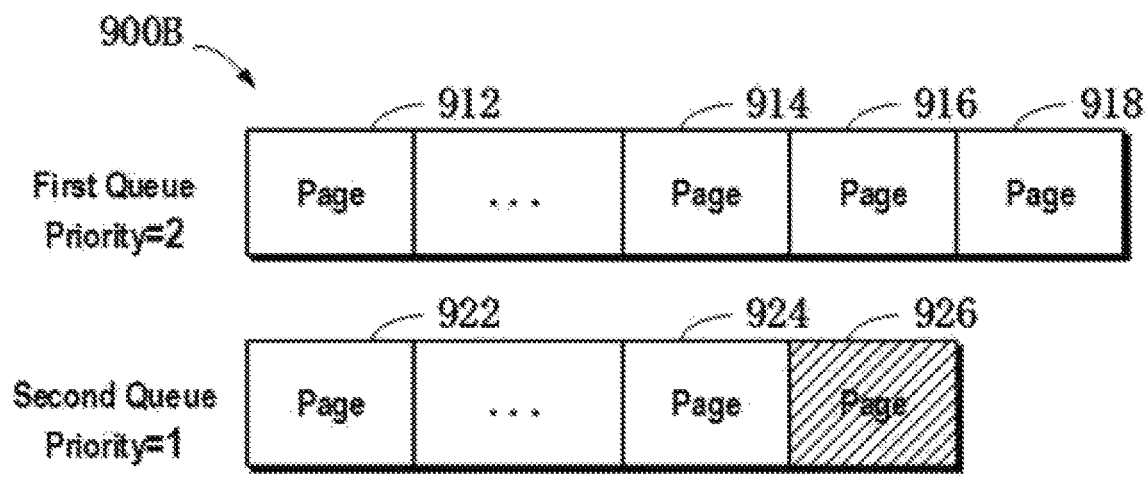
Figure 9C:
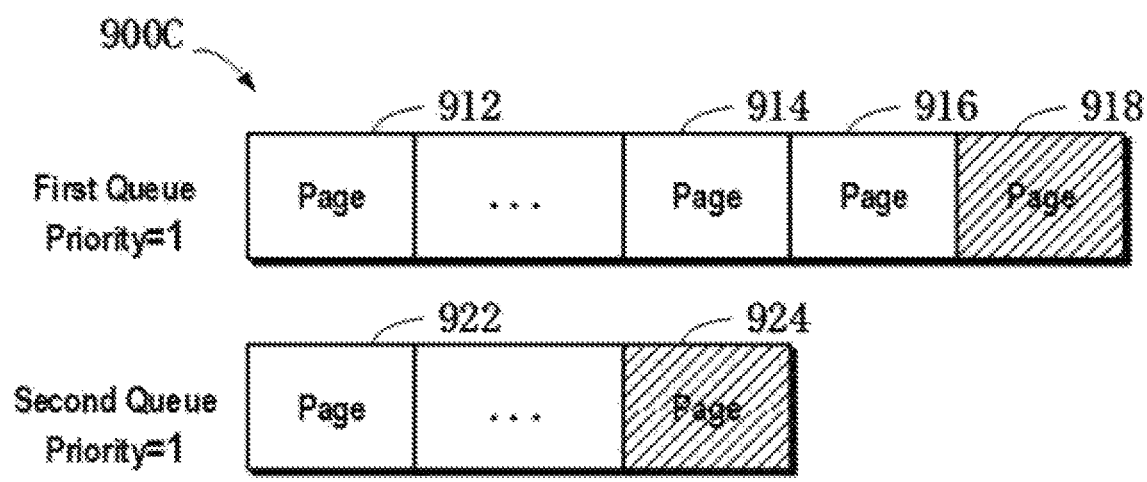

With reference to FIGS. 9A to 9C, description is presented below to details of this embodiment. Specifically, FIGS. 9A, 9B and 9C schematically show block diagrams 900A, 900B and 900C of different rounds for managing a buffer device in a storage system according to one embodiment of the present invention. In this embodiment, a first queue is a waiting queue used for a failed storage device, whose initial priority is 3; a second queue is a waiting queue used for a normal storage device, whose initial priority is 1. Suppose predetermined conditions for the two queues are identical, i.e., "priority=0," and updating rules for both queues are updated priority=current priority−1.

As shown in FIG. 9A, the first queue comprises pages 912, . . . , 914, 916 and 918, and the second queue comprises pages 922, . . . , 924, 926 and 928. With the method described above, in the first round, the priority of the first queue is updated as 3−1=2, and the priority of the second queue is updated as 1−1=0 (satisfying the predetermined condition). At this point, the page 928 at the end of the second queue will be flushed to the second storage device associated with the second queue.

FIG. 9B shows details of the second round, at which point 1 will be re-assigned to the priority of the second queue as the priority has satisfied the predetermined condition. In the second round, the priority of the first queue is updated as 2−1=1, and the priority of the second queue is updated as 1−1=0 (satisfying the predetermined condition). At this point, the page 926 at the end of the second queue will be flushed to the second storage device associated with the second queue.

FIG. 9C shows details of the third round, at which point 1 will be re-assigned to the priority of the second queue. In the third round, the priority of the first queue is updated as 1−1=0 (satisfying the predetermined condition), at which point the page 918 at the end of the first queue will be flushed to the first storage device associated with the first queue. The priority of the second queue is updated as 1−1=0 (satisfying the predetermined condition), at which point the page 924 at the end of the second queue will be flushed to the second storage device associated with the second queue.

In one embodiment of the present invention, the failed storage device is provided with a first level, the second storage device is provided with a second level, and the first level is higher than the second level. In this embodiment, multiple storage devices may have different priorities. For example, regarding the example shown in FIGS. 9A to 9C, since the level of the first storage device is higher than that of the second storage device, the first queue is set to a higher initial priority 3, and the second queue is set to a lower initial priority 1.

In the embodiment shown in FIGS. 9A to 9C, as priorities of the first queue and the second queue differ, the frequencies at which data in the two queues is flushed to respective storage devices also vary. The first queue involves flushing operation only once in three rounds, while the second queue involves flushing operation three times in three rounds. In this embodiment, since the first queue has a higher initial priority, the first queue takes precedence over the second queue in utilizing storage resources in the storage device. In this way, corresponding page scheduling policies may be set for different storage devices in light of different priorities.

In one embodiment of the present invention, the determining a second priority for a second queue included in the buffer device comprises: setting the second priority such that the rate at which the second priority is updated to satisfy the second predetermined condition according to the second updating rule is faster than the rate at which the first priority is updated to satisfy the first predetermined condition according to the first updating rule.

A value of the second priority may be set using various approaches. For example, where the first and second updating rules are identical and the first and second predetermined conditions are identical, a value of the second priority may be set lower than that of the priority. As shown in FIG. 9A, the priority is set to 3, and the second priority is set to 1. In this way, the second priority will satisfy the second predetermined condition in the first round.

For another example, the second priority may further be set to the same value "3" as the priority, but the second updating rule may be provided with a larger decreasing step length, e.g., "3." In this way, the second priority will satisfy the second predetermined condition in the first round.

For another example, both the second priority and the priority may be set to "3," and both the second updating rule and the updating rule may be set to "minus 1," but the second predetermined condition may be set as "priority=2". In this way, the second priority will satisfy the second predetermined condition in the first round. Note specific examples of how to set the priority, predetermined condition and updating rule have been provided for the illustration purpose only. According to requirements of concrete application environments, other methods may further be used to perform functions of the technical solution described herein.

Figure 10:
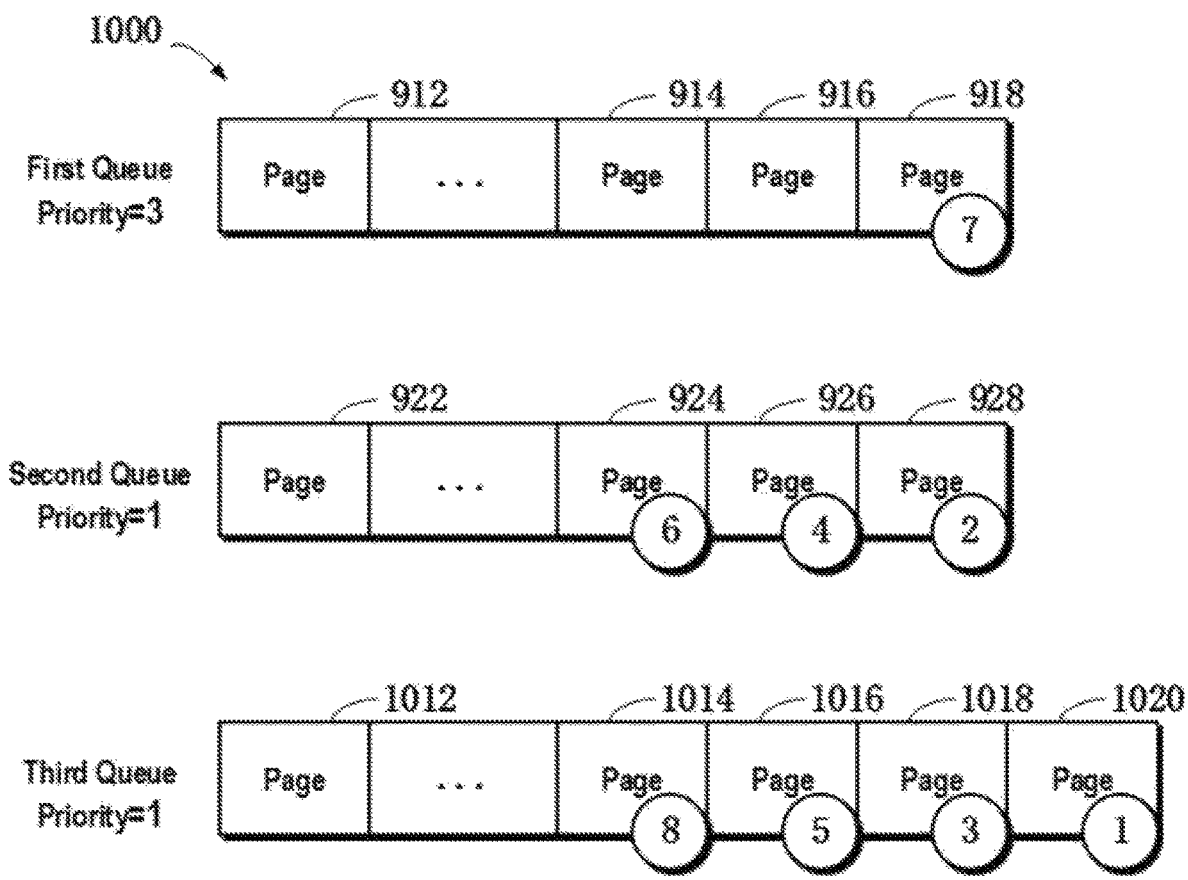
FIG. 10 schematically illustrates a block diagram for managing a buffer device in a storage system according to one embodiment of the present invention.

While the example in which two queues are involved has been described in detail, in other embodiments the buffer device may further comprise more queues. FIG. 10 schematically shows a block diagram 1000 for managing a buffer device in a storage system according to one embodiment of the present invention. As shown in FIG. 10, suppose a first, a second, and a third queues are associated with a first, a second, and a third storage devices respectively. Among them, the first storage device is a failed storage device, and the second and the third storage devices are both normal storage devices, at which point the three queues meet such a level relation: the first level>the second level=the third level. At this point, a higher priority 3 may be assigned to the first queue, and a lower priority 1 may be assigned to each of the second and third queues.

With the method described above, suppose in each round the three queues are processed in an order from bottom to top of FIG. 10, then in the first round, both priorities of the third and second queues are 1, so a page 1020 (denoted as circled 1 in FIG. 10) at the end of the third queue is first flushed, and then a page 928 at the end of the second queue is flushed. Since the priority of the first queue is 3−1=2, so pages in the first queue will not be flushed. In the second round, a page 1018 in the third queue and a page 926 in the second queue are flushed. In the third round, a page 1016 in the third queue, a page 924 in the second queue and a page 918 in the first queue are flushed. In this embodiment, pages are flushed in an order shown in circles in FIG. 10: the page 1020, the page 928, the page 1018, the page 926, the page 1016, the page 924, and the page 918.

In FIG. 10, the first queue may be a queue associated with the failed storage device, while the second and third queues may be queues associated with normal storage devices. As shown in FIG. 10, during flushing, pages in the second and third queues are flushed to corresponding normal storage devices in each round, while a page in the first queue is not flushed until the third round. With the technical solution of the present invention, more spaces may be reserved in the buffer device for the failed storage device.

In one embodiment of the present invention, the method is executed in response to any of: insufficiency of available spaces in the buffer device, and external invocation. The method of the present invention may be executed in different stages of the running of the storage system. For example, the method may be executed where available spaces in the buffer device are insufficient, may be periodically executed, or may be executed in response to invocation.

Figure 11:
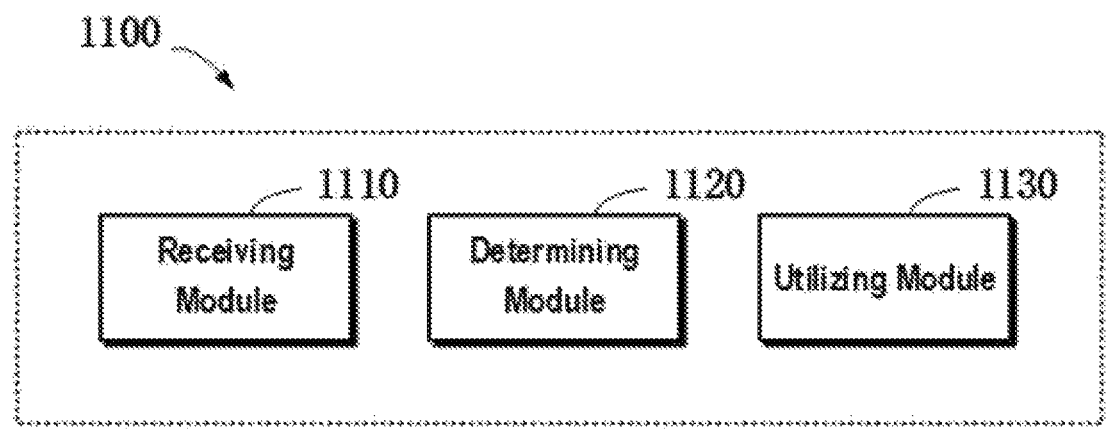
FIG. 11 schematically illustrates a block diagram of a device for managing a storage system according to one embodiment of the present invention.

FIG. 11 schematically shows a block diagram of a device for managing a storage system according to one embodiment of the present invention. As shown in FIG. 11, there is provided a device 1100 for managing a storage system comprising a buffer device and a plurality of storage devices. The device 1100 comprises: a receiving module 1110 configured to receive an access request with respect to the storage system; a determining module 1120 configured to determine a storage device among a plurality of storage devices has been failed; and a utilizing module 1130 configured to, in response to the access request being an access request with respect to the failed storage device, serve the access request with data in the buffer device so as to reduce internal data access in the storage system.

In one embodiment of the present invention, the utilizing module 1130 is further configured to: in response to the access request missing the buffer device, in response to the access request being a reading request, bypass an access history of historical access requests with respect to the storage system; load target data associated with the access request, which is recovered from a further storage device other than the failed storage device in the storage system, to a target page in the buffer device; and return data in the target page from the buffer device so as to respond to the access request.

In one embodiment of the present invention, the device further comprises: a marking module configured to mark the access request in response to the access request being a reading request with respect to the failed storage device.

In one embodiment of the present invention, the device further comprises: a processing module configured to, in response to the access request being a non-marked reading request, process the access request on the basis of an access history of historical access requests with respect to the storage system.

In one embodiment of the present invention, the processing module is further configured to: in response to the access history indicating the frequency of access to data associated with the access request satisfies a predetermined condition, load the data to the buffer device; and in response to the access history indicating the frequency of access to data associated with the access request does not satisfy a predetermined condition, update the access history, and retrieve data associated with the access request from a storage device in the storage system.

In one embodiment of the present invention, the utilizing module 1130 is further configured to: in response to the access request being a writing request, write target data associated with the access request to a target page in the buffer device; and delay flushing data in the target page to the storage device.

In one embodiment of the present invention, the utilizing module 1130 is further configured to: add the target page to a waiting queue, the waiting queue including a data page associated with the failed storage device; determine a priority for the waiting queue; in at least one round, flush data in a data page in the waiting queue to the further storage device on the basis of the priority.

In one embodiment of the present invention, the utilizing module 1130 is further configured to: in response to the priority not satisfying a predetermined condition, update the priority according to an updating rule, the updating rule making the updated priority much closer to the predetermined condition than the priority; and in response to the priority satisfying the predetermined condition, flush data in a data page in the waiting queue to the further storage device.

In one embodiment of the present invention, the utilizing module 1130 is further configured to: set the priority on the basis of at least one of: a response time associated with the failed storage device, a usage rate of the buffer device by the failed storage device, and an access frequency of access requests with respect to the failed storage device.

In one embodiment of the present invention, the utilizing module 1130 is further configured to: determine a second priority for a second waiting queue in the buffer device, the second waiting queue including a data page associated with a second storage device other than the failed storage device; and in at least one round, flush data in a data page in the second waiting queue to the second storage device on the basis of the second priority.

In one embodiment of the present invention, there is provided a device for managing a storage system comprising a buffer device and a plurality of storage devices. The device comprises: one or more processors; a memory coupled to at least one processor of the one or more processors; computer program instructions stored in the memory which, when executed by the at least one processor, cause the device to execute a method for managing a storage system. The method comprises: receiving an access request with respect to the storage system; determining a storage device among a plurality of storage devices has been failed; and in response to the access request being an access request with respect to the failed storage device, serving the access request with data in the buffer device so as to reduce internal data access in the storage system.

In one embodiment of the present invention, the serving the access request with data in the buffer device so as to reduce internal data access in the storage system comprises: in response to the access request missing the buffer device, if the access request is a reading request, bypassing an access history of historical access requests with respect to the storage system; loading target data associated with the access request, which is recovered from a further storage device other than the failed storage device in the storage system, to a target page in the buffer device; and returning data in the target page from the buffer device so as to respond to the access request.

In one embodiment of the present invention, the access request is marked in response to the access request being a reading request with respect to the failed storage device.

In one embodiment of the present invention, in response to the access request being a non-marked reading request, the access request is processed on the basis of an access history of historical access requests with respect to the storage system.

In one embodiment of the present invention, the processing the access request on the basis of an access history of historical access requests with respect to the storage system comprises at least one of: in response to the access history indicating the frequency of access to data associated with the access request satisfies a predetermined condition, loading the data to the buffer device; and in response to the access history indicating the frequency of access to data associated with the access request does not satisfy a predetermined condition, updating the access history, and retrieving data associated with the access request from a storage device in the storage system.

In one embodiment of the present invention, the serving the access request with data in the buffer device so as to reduce internal data access in the storage system comprises: in response to the access request being a writing request, writing target data associated with the access request to a target page in the buffer device; and delaying flushing data in the target page to the storage device.

In one embodiment of the present invention, the delaying flushing data in the target page to the storage device comprises: adding the target page to a waiting queue, the waiting queue including a data page associated with the failed storage device; determining a priority for the waiting queue; in at least one round, flushing data in a data page in the waiting queue to the further storage device on the basis of the priority.

In one embodiment of the present invention, the flushing data in a data page in the waiting queue to the further storage device on the basis of the priority comprises: in response to the priority not satisfying a predetermined condition, updating the priority according to an updating rule, the updating rule making the updated priority much closer to the predetermined condition than the priority; and in response to the priority satisfying the predetermined condition, flushing data in a data page in the waiting queue to the further storage device.

In one embodiment of the present invention, the determining a priority for the waiting queue comprises: setting the priority on the basis of at least one of: a response time associated with the failed storage device, a usage rate of the buffer device by the failed storage device, and an access frequency of access requests with respect to the failed storage device.

In one embodiment of the present invention, a second priority is determined for a second waiting queue in the buffer device, the second waiting queue including a data page associated with a second storage device other than the failed storage device; and in at least one round, data in a data page in the second waiting queue is flushed to the second storage device on the basis of the second priority.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a storage system, the storage system comprising a buffer device and a plurality of storage devices, the method comprising:
    receiving an access request with respect to the storage system;
    determining a storage device among the plurality of storage devices has been failed; and
    in response to the access request being an access request with respect to the failed storage device, serving the access request with data in the buffer device so as to reduce internal data access in the storage system;
    wherein serving the access request with data in the buffer device so as to reduce internal data access in the storage system comprises: in response to the access request missing the buffer device,
        in response to the access request being a reading request, bypassing an access history of historical access requests with respect to the storage system;
        loading target data associated with the access request, which is recovered from at least one further storage device other than the failed storage device in the storage system, to a target page in the buffer device; and
        returning data in the target page from the buffer device so as to respond to the access request.

2. The method according to claim 1, further comprising:
    marking the access request in response to the access request being a reading request with respect to the failed storage device.

3. The method according to claim 2, further comprising:
    in response to a second access request being a non-marked reading request, processing the second access request on the basis of an access history of historical access requests with respect to the storage system.

4. The method according to claim 3, wherein processing the second access request on the basis of the access history of historical access requests with respect to the storage system comprises at least one of:
    in response to the access history indicating the frequency of access to data associated with the second access request satisfies a predetermined condition, loading the data to the buffer device; and in response to the access history indicating the frequency of access to data associated with the second access request does not satisfy a predetermined condition, updating the access history, and retrieving data associated with the second access request from a storage device in the storage system.

5. The method according to claim 1, further comprising:
in response to a second access request being a writing request,
   writing target data associated with the second access request to a second target page in the buffer device; and
   delaying flushing data in the second target page to the storage device.

6. The method according to claim 5, wherein delaying flushing data in the second target page to the storage device comprises:
   adding the second target page to a waiting queue, the waiting queue including a data page associated with the failed storage device;
   determining a priority for the waiting queue; and
   in at least one round of flushing, flushing data in a data page in the waiting queue to a further storage device on the basis of the priority.

7. The method according to claim 6, wherein flushing data in the data page in the waiting queue to the further storage device on the basis of the priority comprises:
   in response to the priority not satisfying a predetermined condition, updating the priority according to an updating rule, the updating rule making the updated priority much closer to the predetermined condition than the priority; and
   in response to the priority satisfying the predetermined condition, flushing data in the data page in the waiting queue to the further storage device.

8. The method according to claim 6, wherein determining the priority for the waiting queue comprises:
   setting the priority on the basis of at least one of: a response time associated with the failed storage device, a usage rate of the buffer device by the failed storage device, and an access frequency of access requests with respect to the failed storage device.

9. The method according to claim 6, further comprising:
   determining a second priority for a second waiting queue in the buffer device, the second waiting queue including a data page associated with a second storage device other than the failed storage device; and
   in at least one round of flushing, flushing data in the data page in the second waiting queue to the second storage device on the basis of the second priority.

10. The method according to claim 1, wherein loading the target data includes:
    reading data blocks from multiple further storage devices, and
    performing a reconstruction operation to reconstruct the target data from the data blocks in accordance with a predefined Redundant Array of Independent Disks (RAID) standard.

11. A device for managing a storage system, comprising:
one or more processors;
a memory coupled to at least one processor of the one or more processors;
computer program instructions stored in the memory which, when executed by the at least one processor, cause the device to execute a method for managing a storage system, the method comprising:
   receiving an access request with respect to the storage system;
   determining a storage device among a plurality of storage devices has been failed; and
   in response to the access request being an access request with respect to the failed storage device, serving the access request with data in the buffer device so as to reduce internal data access in the storage system;
wherein serving the access request with data in the buffer device so as to reduce internal data access in the storage system comprises:
   in response to the access request missing the buffer device, in response to the access request being a reading request, bypassing an access history of historical access requests with respect to the storage system;
   loading target data associated with the access request, which is recovered from at least one further storage device other than the failed storage device in the storage system, to a target page in the buffer device; and
   returning data in the target page from the buffer device so as to respond to the access request.

12. The device according to claim 11, the method further comprising:
   marking the access request in response to the access request being a reading request with respect to the failed storage device.

13. The device according to claim 12, the method further comprising:
   in response to a second access request being a non-marked reading request, processing the second access request on the basis of an access history of historical access requests with respect to the storage system.

14. The device according to claim 13, wherein processing the second access request on the basis of the access history of historical access requests with respect to the storage system comprises at least one of:
   in response to the access history indicating the frequency of access to data associated with the second access request satisfies a predetermined condition, loading the data to the buffer device; and
   in response to the access history indicating the frequency of access to data associated with the second access request does not satisfy a predetermined condition, updating the access history, and retrieving data associated with the second access request from a storage device in the storage system.

15. The device according to claim 11, wherein the method further comprises: in response to a second access request being a writing request,
   writing target data associated with the second access request to a second target page in the buffer device; and
   delaying flushing data in the second target page to the storage device.

16. The device according to claim 15, wherein delaying flushing data in the second target page to the storage device comprises:
   adding the second target page to a waiting queue, the waiting queue including a data page associated with the failed storage device;
   determining a priority for the waiting queue; and
   in at least one round of flushing, flushing data in a data page in the waiting queue to a further storage device on the basis of the priority.

17. The device according to claim 16, wherein flushing data in the data page in the waiting queue to the further storage device on the basis of the priority comprises:

in response to the priority not satisfying a predetermined condition, updating the priority according to an updating rule, the updating rule making the updated priority much closer to the predetermined condition than the priority; and in response to the priority satisfying the predetermined condition, flushing data in the data page in the waiting queue to the further storage device.

18. The device according to claim 16, wherein determining the priority for the waiting queue comprises:

setting the priority on the basis of at least one of: a response time associated with the failed storage device, a usage rate of the buffer device by the failed storage device, and an access frequency of access requests with respect to the failed storage device.

19. The device according to claim 16, the method further comprising:

determining a second priority for a second waiting queue in the buffer device, the second waiting queue including a data page associated with a second storage device other than the failed storage device; and in at least one round of flushing, flushing data in the data page in the second waiting queue to the second storage device on the basis of the second priority.

20. A method for managing a storage system, the storage system comprising a buffer device and a plurality of storage devices, the method comprising:

receiving an access request with respect to the storage system;

determining a storage device among the plurality of storage devices has been failed; and in response to the access request being an access request with respect to the failed storage device, serving the access request with data in the buffer device so as to reduce internal data access in the storage system;

wherein serving the access request with data in the buffer device so as to reduce internal data access in the storage system comprises: in response to the access request being a writing request, writing target data associated with the access request to a target page in the buffer device; and delaying flushing data in the target page to the storage device;

wherein delaying flushing data in the target page to the storage device comprises:

adding the target page to a waiting queue, the waiting queue including a data page associated with the failed storage device;

determining a priority for the waiting queue; and in at least one round of flushing, flushing data in a data page in the waiting queue to a further storage device on the basis of the priority; and wherein the method further comprises:

determining a second priority for a second waiting queue in the buffer device, the second waiting queue including a data page associated with a second storage device other than the failed storage device; and in at least one round of flushing, flushing data in the data page in the second waiting queue to the second storage device on the basis of the second priority.

21. A device for managing a storage system, comprising:
one or more processors;
a memory coupled to at least one processor of the one or more processors;
computer program instructions stored in the memory which, when executed by the at least one processor, cause the device to execute a method for managing a storage system, the method comprising:

receiving an access request with respect to the storage system;

determining a storage device among a plurality of storage devices has been failed; and in response to the access request being an access request with respect to the failed storage device, serving the access request with data in the buffer device so as to reduce internal data access in the storage system;

wherein serving the access request with data in the buffer device so as to reduce internal data access in the storage system comprises:

in response to the access request being a writing request, writing target data associated with the access request to a target page in the buffer device; and delaying flushing data in the target page to the storage device;

wherein delaying flushing data in the target page to the storage device comprises:

adding the target page to a waiting queue, the waiting queue including a data page associated with the failed storage device;

determining a priority for the waiting queue;

in at least one round of flushing, flushing data in a data page in the waiting queue to a further storage device on the basis of the priority; and wherein the method further comprises:

determining a second priority for a second waiting queue in the buffer device, the second waiting queue including a data page associated with a second storage device other than the failed storage device; and in at least one round of flushing, flushing data in a data page in the second waiting queue to the second storage device on the basis of the second priority.

* * * * *